United States Patent [19]
Jones et al.

[11] Patent Number: 5,986,677
[45] Date of Patent: Nov. 16, 1999

[54] ACCELERATED GRAPHICS PORT READ TRANSACTION MERGING

[75] Inventors: Phillip M. Jones, Spring; Ronald T. Horan, Houston; Gregory N. Santos, Cypress, all of Tex.

[73] Assignee: Compaq Computer Corporation, Chandler, Ariz.

[21] Appl. No.: 08/941,859

[22] Filed: Sep. 30, 1997

[51] Int. Cl.$^6$ .................................................. G06F 13/14
[52] U.S. Cl. ...................... 345/521; 345/520; 710/128; 710/129
[58] Field of Search .......................... 345/520, 501–503, 345/521; 710/126–129

[56] References Cited

U.S. PATENT DOCUMENTS

| | | | |
|---|---|---|---|
| 5,479,627 | 12/1995 | Khalidi et al. | 711/202 |
| 5,664,161 | 9/1997 | Fukushima et al. | 345/501 |
| 5,740,381 | 4/1998 | Yen | 395/293 |
| 5,802,568 | 9/1998 | Csoppenszky | 711/136 |
| 5,812,789 | 9/1998 | Diaz et al. | 395/200.77 |
| 5,835,962 | 11/1998 | Chang et al. | 711/206 |
| 5,892,964 | 4/1999 | Horan et al. | 712/23 |

OTHER PUBLICATIONS

HalfHill, "Unclogging the PC Bottlenecks", *BYTE* Sep. '97, vol. 22, No. 9.

Yong, "AGP Speeds 3D Graphics" *MicroProcessor Report*, Jun. 17, 1996.

Brummer, "PCI–to–AGP Move Boosts 3–D Graphics" *Electronic Engineering Times*, 1997, n952, p. 84.

*Primary Examiner*—Kee M. Tung
*Attorney, Agent, or Firm*—Paul N. Katz; Ronald L. Chichester; Frohwitter

[57] ABSTRACT

A computer system having a core logic chipset that functions as a bridge between an Accelerated Graphics Port ("AGP") bus device such as an AGP graphics controller, and a host processor and computer system memory wherein AGP transaction read requests are merged from the AGP graphics controller and retired when these requests are within a cacheline of the memory being accessed. The core logic chipset will request a memory cacheline read as it begins processing a current AGP transaction read request. Once the memory read access is initiated, the transaction read request will be popped off an AGP request queue in order to evaluate the next in order transaction request. If the next request can be partially or completely retired by the memory read access previously started, then the memory access that would have been normally required may be skipped and the data from the previous memory read access is used instead. This AGP read transaction merging may continue until the next in order transaction read request is located in a different cacheline of memory or the original memory request is ready to return data. A memory data buffer may also be utilized to store unused quadwords of the cacheline read from a memory access so that some subsequent AGP transaction requests may be retired without having to access a previously read cacheline of memory.

25 Claims, 5 Drawing Sheets

ACCELERATED GRAPHICS PORT READ TRANSACTION MERGING

BACKGROUND OF THE INVENTION

1. Field of the Invention

The present invention relates to a computer system using a bus bridge(s) to interface a central processor(s), an accelerated graphics port (AGP) video graphics processor(s), main memory and input-output peripherals together, and more particularly, to merging AGP transaction read requests that are within a cacheline of main memory addresses being accessed.

2. Description of the Related Technology

A computer system has a plurality of information buses (used for transferring instructions, data and addresses) such as a host bus, a memory bus, high speed expansion buses such as an Accelerated Graphics Port (AGP) bus and a Peripheral Component Interconnect (PCI) bus, and other peripheral buses such as the Small Computer System Interface (SCSI), Extension to Industry Standard Architecture (EISA), and Industry Standard Architecture (ISA). The processor(s) of the computer system communicates with main memory and with the peripherals that make up the computer system over these various buses.

Increasingly inexpensive but sophisticated processors, such as microprocessors, have revolutionized the role of computer systems, such as personal computers by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Cyrix, IBM, Digital Equipment Corp., Sun Microsystems and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics information stored in memory. This memory may be part of the video graphics processor system, but, preferably, would be best (lowest cost) if part of the main computer system memory because shifting graphics information from local graphics memory to main memory significantly reduces computer system costs when implementing 3-D graphics. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system main memory. The computer system main memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system main memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference. This AGP Specification is available from Intel Corporation, Santa Clara, Calif.

The computer system main memory, typically, may be comprised of fast access synchronous dynamic random access memory (SDRAM). The memory control and interface logic for the SDRAM may be optimized for reading and/or writing a desired number of bytes of information for each memory transaction. A desired number of bytes of information may be, for example, 32 bytes, and may be referred to hereinafter as a "cacheline" or "data paragraph." The number of bytes comprising the cacheline or data paragraph may be optimized for the SDRAM and processor of the computer system, however, peripheral devices such an AGP video controller may not request a memory transaction which is a full cacheline or even aligned on a cacheline address boundary (e.g., 32 byte aligned). An AGP bus agent (e.g., the AGP video graphics controller) requesting a read transaction of less than a full cacheline, may reduce the efficiency of the memory control and interface logic in processing the AGP bus transactions because an increased number of main memory accesses may be required to retire these sub-cacheline AGP read transactions.

What is needed to more fully and efficiently utilize the computer system and its main memory is a system, method and apparatus for merging AGP read transaction requests from an AGP device to the main memory that are less than a full cacheline in size or are not cacheline address aligned.

OBJECTS OF THE INVENTION

It is therefore an object of the present invention to merge AGP read transaction requests that are less than a cacheline when accessing a computer system main memory.

Another object is to store at least one full cacheline from a read access of a computer system main memory and use the stored cacheline to retire a subsequent one or more quadword read transaction requests from an AGP device.

Still a further object is to retire a plurality of AGP read transaction requests within a cacheline boundary with a single cacheline read access to a computer system main memory.

SUMMARY OF THE INVENTION

The above and other objects of the present invention are satisfied, at least in part, by providing in a computer system a core logic chipset that interconnects a processor(s), a main memory and peripheral devices. A memory controller and interface logic of the core logic chipset is used for memory accesses, both read and write, and refresh cycles to the main memory. The main memory may be synchronous dynamic random access memory (SDRAM). The memory controller and interface logic may perform memory accesses for a certain number of bytes of information at one time. The number of bytes of information accessed by the memory controller and interface logic in one transaction is designed to result in the most efficient operation of the main memory, which ultimately results in the highest memory bandwidth or data throughput. Different types of computer systems, i.e., using various combinations of microprocessors and types of main memory, may have a different optimum number of bytes of information that may be accessed at one time.

For purposes of discussion and illustration hereinafter, a byte is eight (8) bits, wherein a bit is a representation of a binary one or zero (electrical circuit on or off, respectively); a word is two (2) bytes or 16 bits; a doubleword is two (2) words, four (4) bytes or 32 bits; a quadword is four (4) words, eight (8) bytes or 64 bits, and a cacheline or data paragraph is four (4) quadwords or 32 bytes. One of ordinary skill in the art will readily appreciate that a cacheline or data paragraph may comprise any number of bytes of information, preferably in increments of $2^n$, where n is a positive integer number. The present invention contemplates a cacheline or data paragraph of any size, the cacheline size being determined solely by the computer system platform and type of main memory used in the computer system.

The AGP specification, incorporated by reference herein above, is general in nature and may be used across different types of computer platforms. An AGP device, such as a video graphics controller, may not necessarily request read transactions to the main memory according to the most efficient accessing of a particular computer system's main memory. Therefore, inefficiencies may result that could significantly degrade performance of the computer system. The AGP specification defines an AGP device request transaction size of from one quadword to eight cachelines. For example, if an AGP agent (requesting device) requests a plurality of single quadword read transactions, then the memory controller would have to make a plurality of cacheline reads to the main memory in order to retire the plurality of single quadword requests from the AGP agent. In this example, the AGP agent uses only one quadword from each cacheline memory transaction, i.e., one out of four quadwords read are actually used by the AGP agent, the others are ignored. This results in a memory controller efficiency of only 25 percent. Another problem results when there are a plurality of read transaction requests of any size that are not cacheline address aligned. Since the memory controller will perform main memory accesses a cacheline at a time, starting at a cacheline address boundary, any read transaction request crossing over the cacheline address boundary will force the memory controller to perform an additional memory access to retire the last read transaction request. It is therefore desirable to store the most recently read information cacheline from the main memory in order to possibly retire subsequent AGP bus agent read transactions that may fall within the last read cacheline.

In an embodiment of the present invention, as soon as a first AGP bus agent transaction read request is evaluated (decoded), a memory read access of cacheline width will be started. Once the memory read access is initiated by the first AGP transaction read request, the first AGP transaction read request then may be popped off the request queue so that the next AGP transaction read request may be evaluated to see if it can be partially or completely retired by the current memory access, i.e., the next AGP transaction read request falls within the cacheline of memory being read. This may continue until the next in order AGP transaction read request requires a different cacheline address, or the main memory is ready to return data (32 bytes or one cacheline of information). Thus, a plurality of AGP transaction read requests from an AGP bus agent that are smaller than a cacheline in size and fall within the same cacheline of memory, may be retired with a single memory access. This operation shall be referred to hereinafter as "AGP read transaction merging" wherein a plurality of AGP transaction read requests from the AGP bus agent are merged into a single main memory read access. Using the AGP read transaction merging of the present invention results in the best efficiency between the computer system and main memory when loading AGP graphics texture information from the main memory.

AGP transactions requiring graphics textures from the main memory are generally read only, and therefore do not have coherency problems. The present invention is especially beneficial when an AGP agent requests read transactions that are neither a cacheline in size nor cacheline address aligned. AGP operation, including access ordering rules, are described in the AGP specification entitled "Accelerated Graphics Port Interface Specification Revision 1.0," dated Jul. 31, 1996, the disclosure of which is incorporated by reference herein.

In another embodiment of the present invention, a memory data buffer stores at least one cacheline of information (four quadwords or 32 bytes) from a memory read access(es). The 32 bytes (cacheline) of information (32 bytes is for illustration only, any size cacheline number of bytes is contemplated herein) stored in the memory data buffer may be used to retire subsequent AGP bus agent transaction read requests before the memory controller has to perform another memory access. For example, the last transaction read request from an AGP agent ends on the first quadword of a cacheline. The memory controller of the computer system has to retrieve an entire cacheline from the memory in order to obtain this first quadword for retiring the AGP agent's transaction read request. The present invention can store all four of the quadwords comprising the cacheline from the memory read access in the memory data buffer. When the AGP agent subsequently requests another read transaction from memory, there is a high probability that this transaction will be requesting the second, third and/or fourth quadwords already stored in the memory data buffer. The transaction read request(s) from the AGP agent may be serviced and retired from the quadwords already stored in the memory data buffer without the memory controller having to do another memory access. Subsequent transaction read requests falling on a different cacheline address boundary will require a new memory access(es), but this new memory access will be aligned on a cacheline address.

The memory data buffer may be more than one cacheline in capacity. Storing a plurality of cachelines of information in the memory data buffer allows read ahead and smart prefetching of multiple cachelines of AGP graphics information from the main memory. This may be advantageous when the computer system can do memory read accesses concurrently with other operations, i.e., the main memory bus is idle, and doing an anticipatory smart prefetch does not delay other computer transactions running or pending.

An advantage of the present invention is that transaction merging will enable more efficient utilization of main memory read accesses for a given number of AGP bus agent transaction read requests.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention provides in a computer system a core logic chipset that interconnects a processor(s), a main memory and peripheral devices. A memory controller and interface logic of the core logic chipset is used for memory accesses, both read and write, and refresh cycles to the main memory. The main memory may be synchronous dynamic random access memory (SDRAM). The memory controller and interface logic may perform memory accesses for a certain number of bytes of information at one time. The number of bytes of information accessed by the memory controller and interface logic in one transaction is designed to result in the most efficient operation of the main memory, which ultimately results in the highest memory bandwidth or data throughput. Different types of computer systems, i.e., using various combinations of microprocessors and types of main memory, may have a different optimum number of bytes of information that may be accessed at one time.

The AGP Specification entitled "Accelerated Graphics Port Interface Specification Revision 1.0," dated Jul. 31, 1996, as referenced above, is available from Intel Corporation, and is hereby incorporated by reference. Further definition and enhancement of the AGP Specification is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned, co-pending U.S. patent application Ser. No. 08/853,289; filed May 9, 1997 now U.S. Pat. No. 5,889,970, entitled "Dual Purpose Apparatus, Method and System for Accelerated Graphics Port and Peripheral Component Interconnect" by Ronald T. Horan and Sompong Olarig, and which is hereby incorporated by reference. A detailed description of enhancements made to AGP is also disclosed in commonly owned, co-pending patent application U.S. patent application Ser. No. 08/925,772 filed Sep. 8, 1997, entitled "Graphics Address Remapping Table Entry Feature Flags for Customizing the Operation of Memory Pages Associated with an Accelerated Graphics Port Device" by Ronald T. Horan, Phillip M. Jones, Gregory N. Santos, Robert Allan Lester, and Robert Elliott, and is hereby incorporated by reference.

Figure 1:
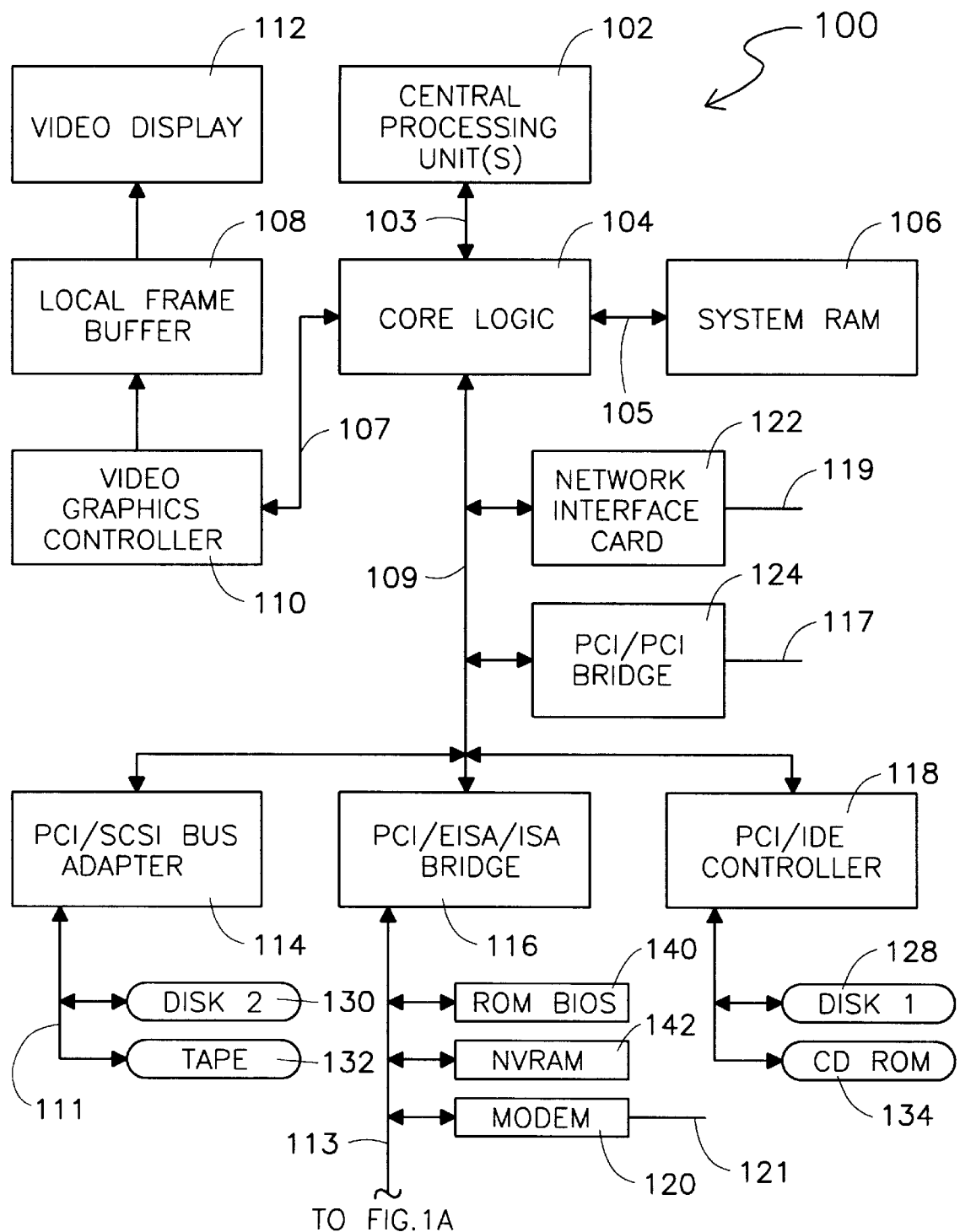
FIG. 1 is a schematic block diagram of a computer system according to the present invention.
Figure 1A:
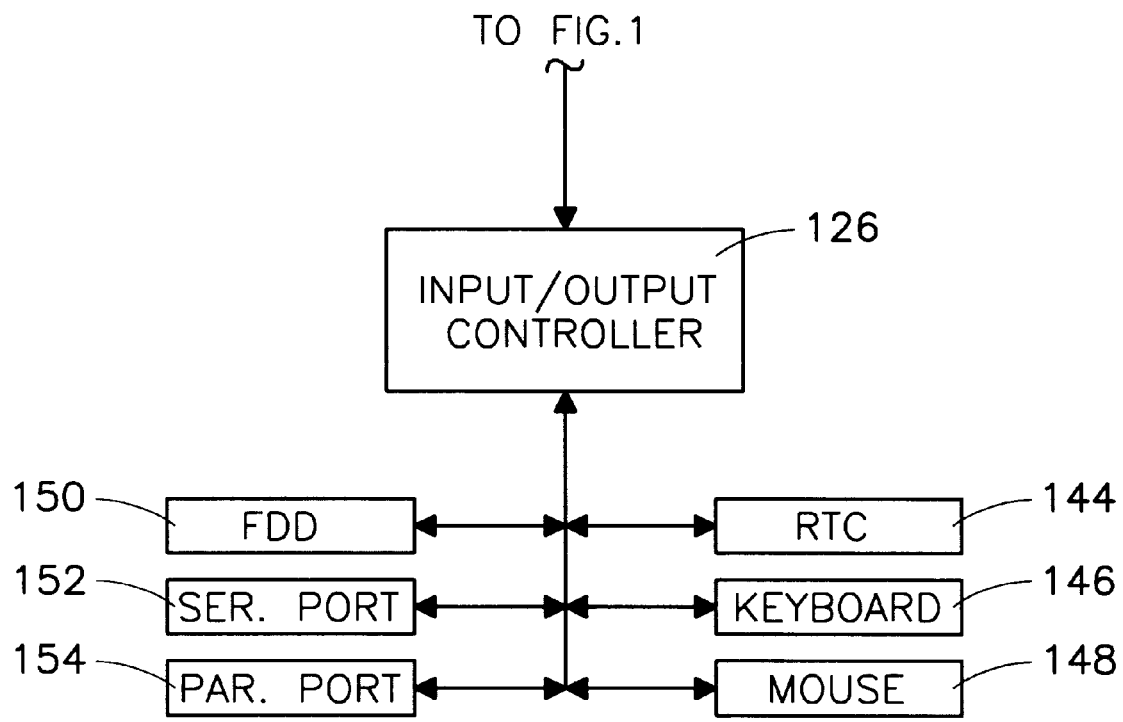

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system is generally indicated by the numeral 100 and comprises a central processing unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration. The video graphics controller 110 may also be referred to hereinafter as an "AGP processor," "AGP bus agent" or "AGP agent."

The CPU(s) 102 is connected to the core logic 104 through a host bus 103. The system RAM 106 is connected to the core logic 104 through a memory bus 105. The video graphics controller(s) 110 is connected to the core logic 104 through an AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113.

Figure 2:
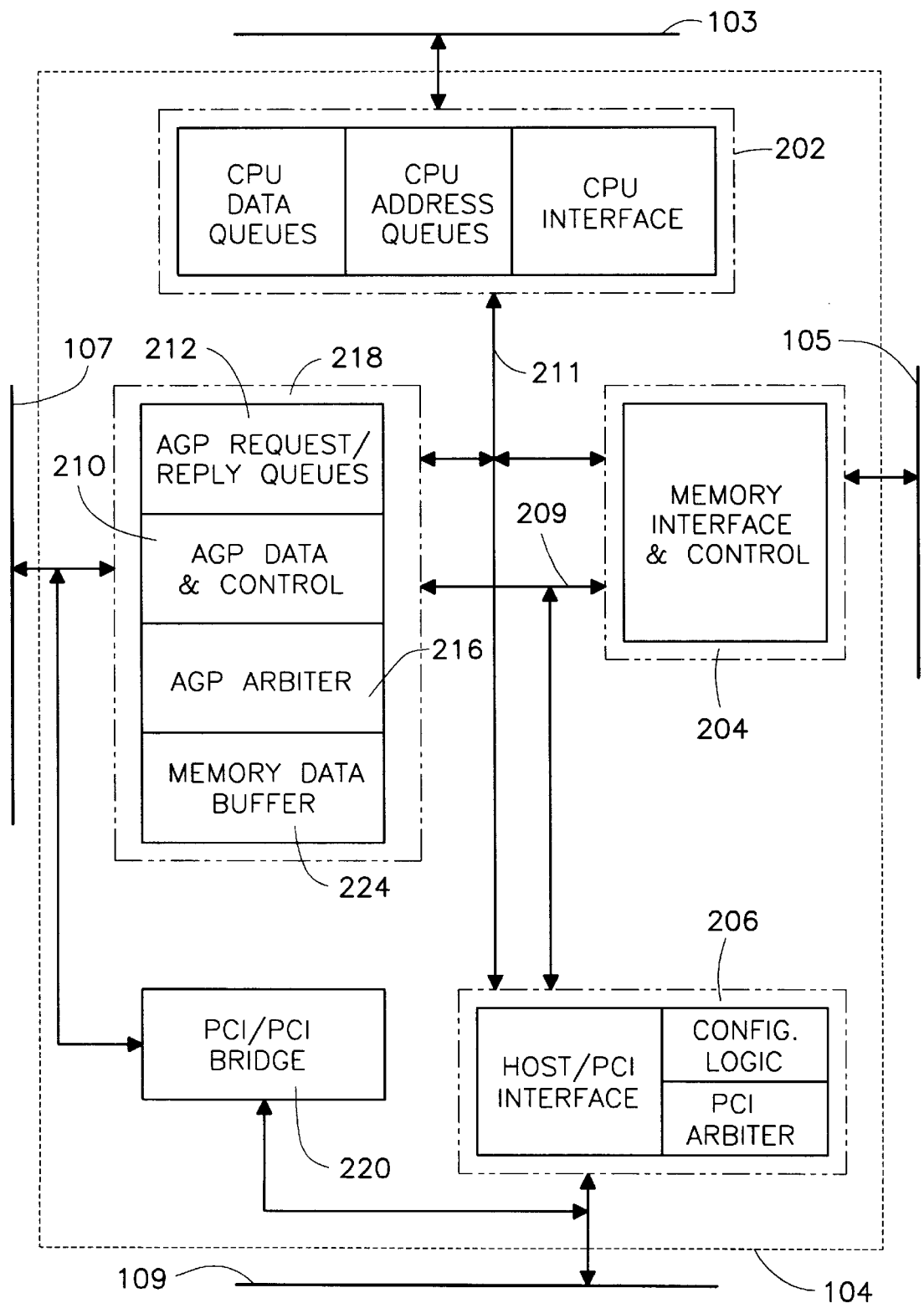
FIG. 2 is a schematic functional block diagram of an embodiment of the present invention according to the computer system of FIG. 1.

Referring now to FIG. 2, a schematic functional block diagram of the core logic 104 of FIG. 1, according to the present invention, is illustrated. The core logic 104 functionally comprises CPU host bus interface and queues 202, a memory interface and control 204, a host/PCI bridge 206, an AGP logic 218, and a PCI/PCI bridge 220. The AGP logic 218 comprises AGP request/reply queues 212, an AGP data and control 210, an AGP arbiter 216, and a memory data buffer 224. The CPU host bus interface and queues 202 connect to the host bus 103 and include interface logic for all data, address and control signals associated with the CPU(s) 102 of the computer system 100. Multiple CPUs 102 and cache memory associated therewith (not illustrated) are contemplated and within the scope of the present invention.

The CPU host bus interface and queues 202 interface with the host/PCI bridge 206 and memory interface and control 204 over a core logic bus 211. The CPU host bus interface and queues 202 interface with the AGP logic 218 over the core logic bus 211. The memory interface and control 204 interfaces with the AGP logic 218 over a core logic bus 209. An advantage of having separate buses 209 and 211 is that concurrent bus operations may be performed thereover. For example, AGP graphics data stored in system RAM 106, connected to the bus 105, may be transferring to the video graphics controller 110 (AGP device) on the AGP bus 107 while the CPU 102 on the host bus 103 is accessing an independent PCI device (i.e., NIC 122) on the PCI bus 109.

The host bus interface and queues 202 allow the CPU 102 to pipeline cycles and schedule snoop accesses. The memory interface and control 204 generates the control and timing signals for the computer system RAM 106 which may be synchronous dynamic RAM (SDRAM) and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which ensures that the next memory address is available on the memory bus 105 before the current memory cycle is complete. This results in minimum delay, if any, between memory cycles. The host/PCI bridge 206 controls the interface to the PCI bus 109. When the CPU 102 accesses the PCI bus 109, the host/PCI bridge 206 operates as a PCI master. When a PCI device is a master on the PCI bus 109, the host/PCI bridge 206 operates as a PCI slave (target). The host/PCI bridge 206 contains base address registers for PCI device targets on its PCI bus 109 (not illustrated). Operation of PCI is more fully described in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are hereby incorporated by reference and are available from the PCI Special Interest Group, P.O. Box 14070, Portland, Oreg. 97214.

The AGP data and control 210, AGP arbiter 216, and AGP request/reply queues 212 interface to the AGP bus 107 and also have signal, power and ground connections (not illustrated) for implementation of signals defined in the AGP and PCI specifications incorporated by reference hereinabove. The AGP bus 107 is adapted for connection to an AGP device(s) and/or an AGP connector(s) (not illustrated).

The PCI/PCI bridge 220 is connected between the PCI bus 109 and the AGP bus 107. The PCI/PCI bridge 220 allows existing enumeration code in the computer system BIOS 140 to recognize and handle AGP compliant devices, such as the video graphics controller 110, residing on the AGP bus 107. The PCI/PCI bridge 220, for example, may be used in configuring the control and status registers of the AGP graphics controller 110 or the AGP logic 218 by bus enumeration during POST, both being connected to the AGP bus 107.

The memory interface and control 204 accesses the RAM 106 a cacheline at a time, i.e., 32 bytes of information are transferred between the memory interface and control 204 and the RAM 106 during each memory access. These 32 bytes of information are available to be either transferred to or from the requesting agent, depending on whether a memory read or write, respectively, was performed. The requesting agent may or may not use all of the 32 bytes (one cacheline) of information from the memory interface and control 204. The host bus interface and queues 202 can process one cacheline of information at a time from the memory interface and control '204, but the host/PCI bridge 206 and AGP logic 218 may not. Transaction read requests from an AGP agent on the AGP bus 107 may not always request memory transactions of a cacheline in size nor request a read transaction starting on a cacheline address boundary. This may reduce the computer system efficiency because more memory accesses are required to retire the AGP agent memory transaction requests that are not a full cacheline in size nor cacheline address aligned.

The present invention solves the aforementioned inefficiencies when an AGP bus agent, such as the video graphics controller 110, requests a memory read transaction that is not a full cacheline in size nor cacheline address aligned. According to an embodiment of the present invention, a transaction read request on the AGP bus 107 is read from the AGP request queue 212 which causes the memory interface and control 204 to initiate a memory read access of at least one cacheline of the RAM 106. Once this memory read access is initiated by the memory interface and control 204, the initial AGP transaction read request may be popped off the AGP request queue 212 so that the next AGP transaction read request in the AGP request queue 212 may be evaluated to see if it may also be partially or completely retired by the current memory access, i.e., one or more of the quadwords read from the current memory read access may satisfy this next transaction request. This may continue until the next in order AGP transaction read request requires a different cacheline address, or the main memory is ready to return data (32 bytes, four quadwords or one cacheline of information). Thus, a plurality of AGP transaction read requests from the video graphics controller 110 that are smaller than a cacheline in size and fall within the same cacheline of memory, may be retired with a single memory access by the memory interface and control 204. This operation shall be referred to hereinafter as "AGP read transaction merging" wherein a plurality of AGP transaction read requests from a bus agent are merged into a single memory read access. Using the AGP read transaction merging of the present invention results in the best efficiency between the computer system and main memory when loading AGP graphics texture information from the main memory.

AGP transactions requiring graphics textures from the main memory are generally read only, and therefore do not have special access ordering or coherency problems. The present invention is especially beneficial when used with an AGP agent that requests read transactions that are neither a cacheline in size nor cacheline address aligned. AGP operation including access ordering rules are described in the AGP specification.

Figure 3:
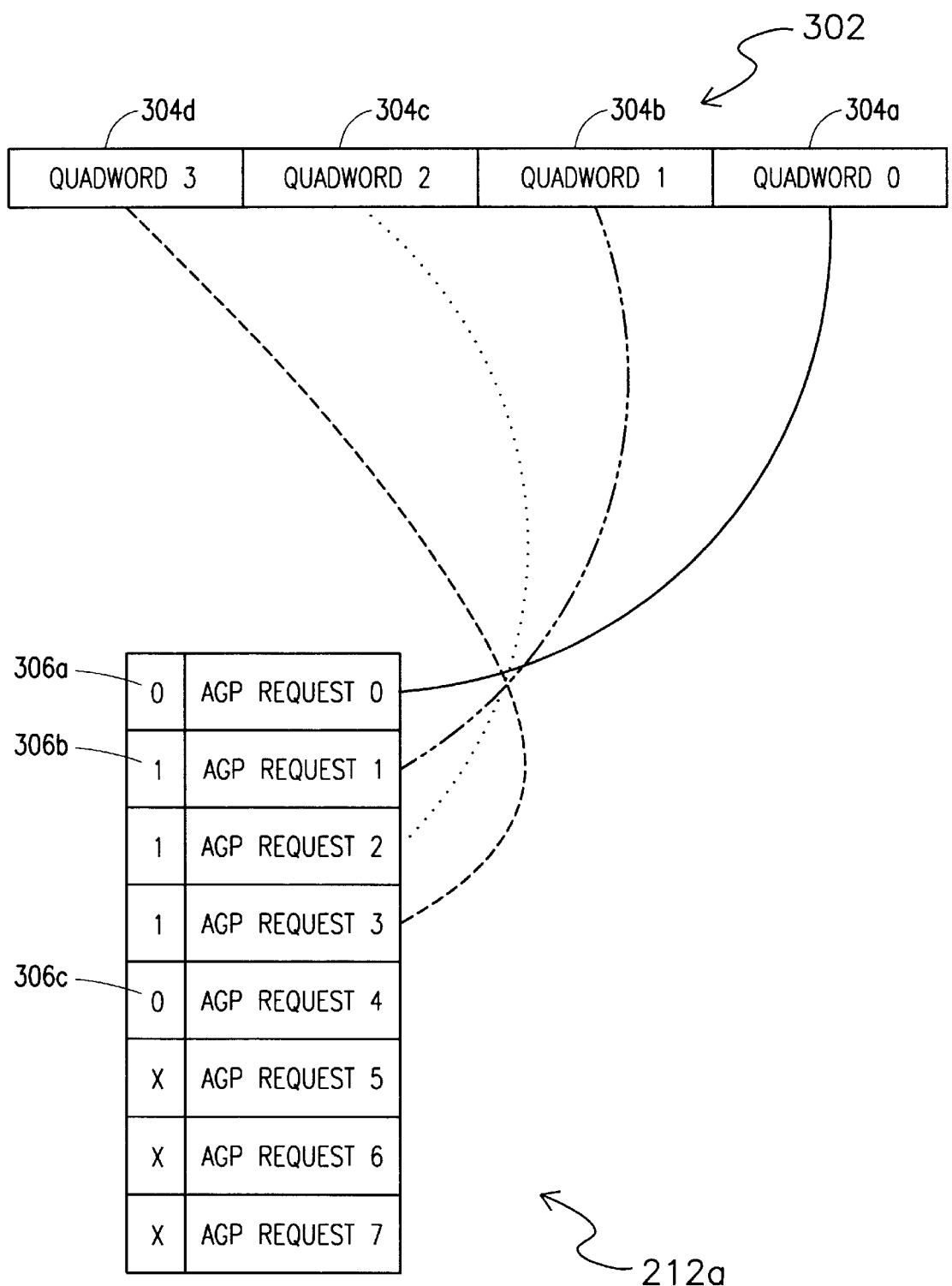
FIG. 3 is a schematic block diagram of a cacheline from memory and a plurality of queued AGP requests according to the present invention.

According to the AGP specification, referenced above and incorporated by reference herein, return of read data requested by the video graphics controller 110 (AGP agent bus master) is indicated by assertion of a grant signal (GNT#) and then a target ready signal (TRDY#). A status bus signal (ST[2::0]) indicates to the AGP master what type of transaction is occurring on the AGP bus. ST[2::0] has meaning to the AGP master only when its GNT# is asserted. Referring now to FIG. 3, a schematic block diagram of a cacheline of graphics data quadwords 304a–304d from the RAM 106 and a plurality of queued AGP requests in the AGP request queue 212a is illustrated. The cacheline of quadwords 304a–304d is generally illustrated by the numeral 302. When an AGP request 0 is received in the AGP request queue 212a, the AGP request 0 is evaluated (decoded) to determine what cacheline memory address(es) needs to be fetched from the main memory RAM 106. In the example illustrated in FIG. 3, the AGP request 0 is requesting the quadword 0 (304a) which may be cacheline address aligned, but does not have to be, e.g., AGP request 0 could have requested the quadword 1 (304b). As soon as the first AGP request is decoded, a request is made to the memory interface and control 204 to access the required cacheline address(es) in the RAM 106. During this memory access the AGP logic 218 evaluates the subsequent AGP requests in the AGP request queue 212a to determine if any of these subsequent AGP requests are for the quadwords comprising the memory cache line being fetched by the memory interface and control 204. In this example, information for the AGP requests 1–3 are also contained in the cacheline 302 as the quadwords 1–3 (304b–304d). The present invention sets bits 306b to a logic 1 so that a new memory access is not started for each of these AGP requests 1–3, and when the cacheline data is returned from the memory read access, the bits 306b also indicate that the GNT# and TRDY# may be asserted, as quickly as possible according to the AGP specification, for the three AGP requests 1–3 subsequent to the first AGP request 0 which started the memory access. AGP request 4 does not correspond within the quadwords contained within the cacheline 302 being received from the RAM 106 so its bit 306c is cleared (not set) to 0. Seeing a 0 in the bit 306c associated with the AGP request 4, the AGP logic 218 initiates another request to the memory interface and control 204 for a next cacheline of memory containing the quadword associated with the AGP request 4. Once accessing this next cacheline of memory is initiated, the AGP logic 218 may evaluate subsequent AGP requests 5–stored in the AGP request queue 212a and set or not set the associated bits 306 depending on whether these subsequent AGP requests can be retired by the next cacheline of memory being fetched. In this way AGP requests associated with the same cacheline of memory 302 may be merged into one cacheline memory access and thereby retired.

Figure 4:
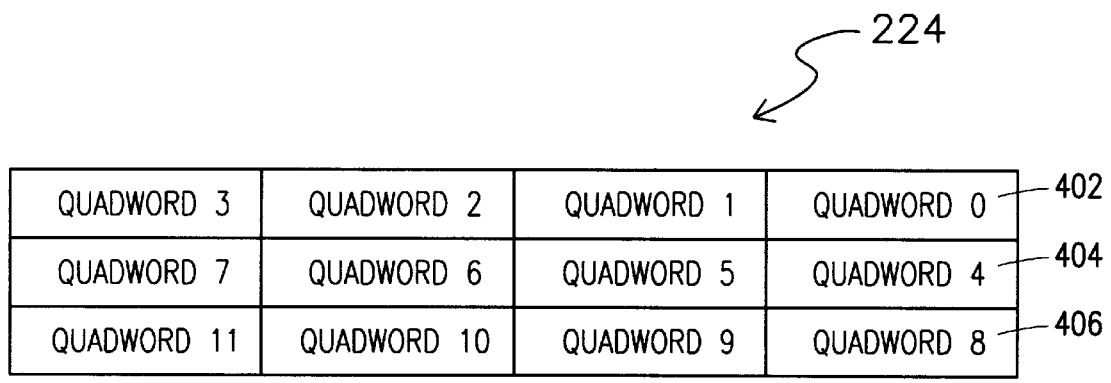
FIG. 4 is a schematic block diagram of a memory data buffer storing a plurality of cachelines from memory and a plurality of queued AGP requests according to another embodiment of the present invention.
Figure 4:
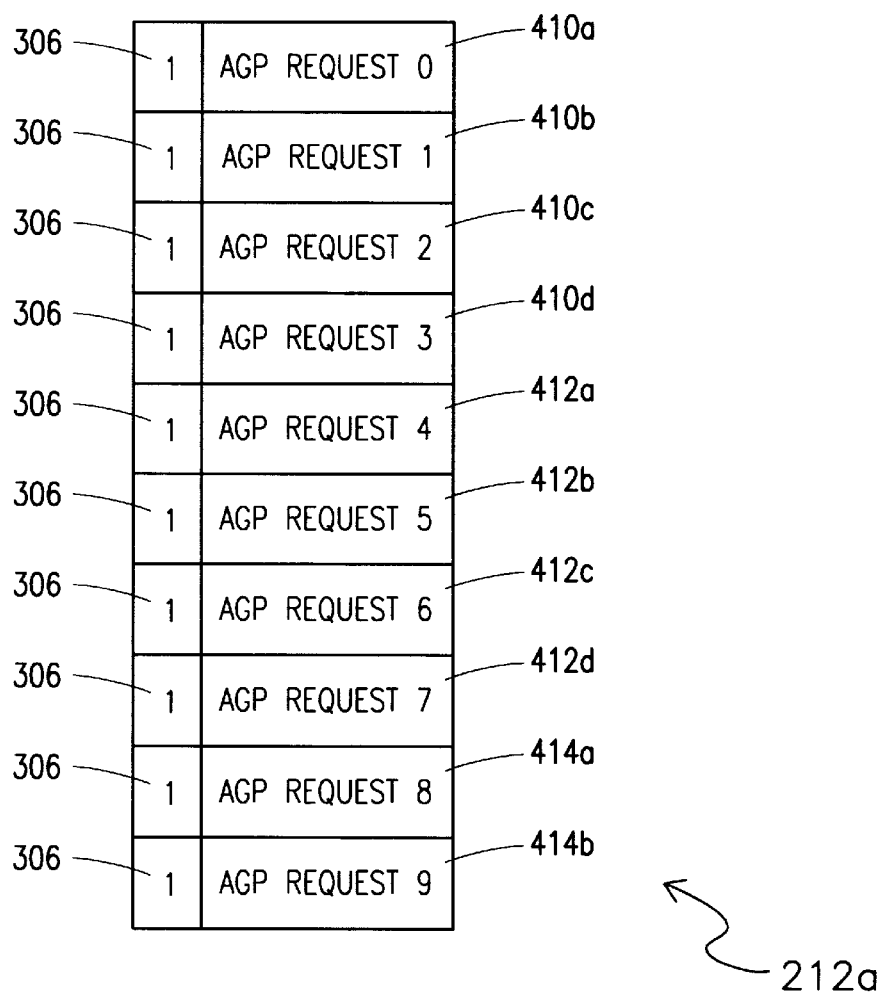

Another embodiment of the present invention further comprises the memory data buffer 224 which may store at least one cacheline of information from a memory read access. The 32 bytes or four quadwords (cacheline) of information (32 bytes is for illustration only, any size cacheline number of bytes is contemplated herein) stored in the memory data buffer 224 may be used to retire subsequent AGP bus agent transaction read requests before having to perform another memory access to the RAM 106. Referring now to FIG. 4, a schematic block diagram of the memory data buffer 224 storing three cachelines of graphics data from the RAM 106 and a plurality of queued AGP requests in the AGP request queue 212a is illustrated. The first cacheline 402 stores quadword 0, quadword 1, quadword 2 and quadword 3. The second cacheline 404 stores quadword 4, quadword 5, quadword 6 and quadword 7. The third cacheline 406 stores quadword 8, quadword 9, quadword 10 and quadword 11. Typically, the computer system will store the first cacheline 402 based upon an AGP agent read request for at least one of the quadwords (0–3) contained therein. The second and third cachelines 404 and 406 may be read from the RAM 106 if the computer system is capable of doing read ahead and smart prefetching of multiple cachelines of AGP graphics information when the main memory bus is idle. The second and third cachelines 404 and 406 may not be used but because of the sequential nature of large blocks of AGP quadwords being stored in the RAM 106, there is a good chance that the cachelines 404 and 406 will be used to retire future AGP agent requests.

For example, the last transaction request, illustrated in FIG. 4 as the AGP request 410a from the video graphics controller 110 may end on the first quadword of a cacheline, illustrated in FIG. 4 as the quadword 0 of the cacheline 402. The memory interface and control 204 retrieves the entire cacheline 402 from the RAM 106 in order to obtain the quadword 0 in order to retire the video graphics controller's 110 transaction request 410a. All four of the quadwords 0–3 comprising the cacheline 402 from the RAM 106 memory access are stored in the memory data buffer 224. When the video graphics controller 110 subsequently requests another read transaction from the RAM 106 (e.g., transaction requests 410b, 410c, and/or 410d), there is a high probability that this transaction will be requesting the second, third and/or fourth quadwords (quadwords 1–3) already stored in the memory data buffer 224 cacheline 402. The transaction request(s) from the video graphics controller 110 may be serviced and retired from the quadwords 1–3 already stored in the memory data buffer 224 cacheline 402 without the memory interface and control 204 having to do another memory access to the RAM 106. Further subsequent AGP transaction read requests (transaction requests 412a–412d, or 414a and 414b) falling on a different cacheline address boundary will require a memory access(es), but this memory access will be aligned on a cacheline address. Thus, transaction request 4 12a will start another memory access and this memory access will return quadwords 4–7 which may be used to retire the transaction requests 412a–412d.

The AGP graphics data returned from the RAM 106 during a memory access need not be stored in the memory data buffer 224 if the AGP logic can retire AGP transaction read requests immediately when the data is presented. The primary purpose of the memory data buffer 224 is to retain any unused quadwords so that a future AGP transaction read request may be retired without having to start another memory access. This is especially important when the last AGP transaction request did not end on a cacheline boundary, i.e., only two or three of the quadwords were used to retire the AGP requests. Since all memory accesses are aligned to a cacheline address boundary, the memory data buffer 224 allows better utilization of the full cacheline of AGP graphics information returned, even if some of that AGP graphics information may be used after being temporarily stored in the memory data buffer 224. This also reduces the number of memory accesses required since all of the quadwords returned on a memory access may eventually be used to retire the read requests of the AGP agent (video graphics controller 110).

The memory data buffer 224 illustrated in FIG. 4 is three cachelines in capacity, however, any number of cachelines of storage may comprise the memory data buffer 224, and is contemplated herein for the present invention. Storing a plurality of cachelines of information in the memory data buffer 224 allows read ahead and smart prefetching of multiple cachelines of AGP graphics information from the main memory (RAM 106). This may be advantageous when the computer system can do memory read accesses concurrently with other operations, i.e., the main memory bus is idle, and doing an anticipatory smart prefetch does not delay other computer transactions running or pending. If three of the cachelines 402, 404 and 406 are returned from a fetch and subsequent prefetches of the RAM 106, all of the transaction requests 410a–410d, 412a–412d, and 414a–414b may be retired as soon as they occur.

The memory data buffer 224 may be a first-in-first-out (FIFO) memory. AGP transaction requests may be retired directly from the AGP graphics data when it becomes available from the RAM 106, or if the memory accesses are returning AGP graphics data ahead of the corresponding AGP transaction requests, then the AGP transaction requests may be retired from quadwords stored in the memory data buffer 224. Using the FIFO for the memory data buffer 224 allows quadwords to be pushed on (read accesses from the RAM 106) and popped off (retiring AGP transaction requests). Bits 306 may be set to a logic 1 if the corresponding quadword is being read from a current memory access or if the corresponding quadword is already stored in the memory data buffer 224. All of the bits 306 are set to 1 in the example illustrated in FIG. 4 because all of the corresponding quadwords have been either fetched or stored in the cachelines 402, 404 and 406 of the memory data buffer 224. If an AGP transaction request was not being returned by the memory access or was already stored in the memory data buffer 224, then its corresponding bit would be cleared to a logic 0. The logic 0 would indicate to the AGP logic 218 that a new memory read access was required. The logic 1 would indicate to the AGP logic 218 that the quadwords necessary to retire the corresponding AGP transaction requests were immediately available and that the GNT# and TRDY# may be asserted to the AGP agent in response to its AGP transaction requests.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset which connects a computer processor and memory to an accelerated graphics port (AGP) processor, said system comprising:
    a processor executing software instructions and generating graphics data;
    a main memory having an addressable memory space comprising a plurality of bytes of storage, wherein each of said plurality of bytes of storage has a unique address;
    said software instructions and said graphics data being stored in some of said plurality of bytes of storage of said main memory;
    an accelerated graphics port (AGP) processor generating video display data from said graphics data and adapted for connection to a video monitor to display said video display data;
    a core logic chipset comprising a processor interface logic, a memory interface logic and an AGP interface logic;
    said processor interface logic is connected to said processor;
    said memory interface logic is connected to said main memory;
    said processor interface logic is connected to said memory interface logic;
    said AGP interface logic is connected to said memory interface logic;
    said AGP interface logic having an AGP request queue that stores transaction requests from said AGP processor, wherein a read request in said AGP request queue causes said memory interface logic to initiate a cacheline read access of said main memory to retire the read request; and
    said AGP interface logic reading a next transaction request from said AGP request queue to determine if the initiated cacheline read access of said main memory can retire the next transaction request, if so, the next transaction request does not cause said memory interface logic to initiate another cacheline access of said main memory, and if not so, the next transaction request causes said memory interface logic to initiate another cacheline access of said main memory.

2. The computer system of claim 1, wherein said AGP interface logic continues to read subsequent transaction requests from said AGP request queue to determine if the initiated cacheline read access of said main memory can retire these subsequent transaction requests, if so, the subsequent transaction requests do not cause said memory interface logic to initiate another cacheline access of said main memory, and if not so, a one of the subsequent transaction requests which cannot be retired from the initiated cacheline read access will cause said memory interface logic to initiate a subsequent cacheline access of said main memory.

3. The computer system of claim 1, wherein said AGP logic further comprises a memory data buffer for storing bytes of data received from the initiated cacheline read access of said main memory, and said AGP logic using these stored bytes of data in said memory data buffer to retire a future AGP transaction read request.

4. The computer system of claim 3, wherein said memory data buffer stores bytes of data from a plurality of cacheline read accesses of said main memory.

5. The computer system of claim 4, wherein the plurality of cacheline read accesses of said main memory are the initiated cacheline read access and at least one prefetched cacheline read access of said main memory.

6. The computer system of claim 4, wherein the bytes of data stored in said memory data buffer are used to retire at least one future AGP transaction read request.

7. The computer system of claim 3, wherein the future AGP transaction read request is a plurality of future AGP transaction read requests.

8. The computer system of claim 1, wherein the transaction read request from said AGP processor is for at least one quadword, where a quadword is eight bytes of data.

9. The computer system of claim 8, wherein a cacheline is four quadwords.

10. The computer system of claim 1, wherein said core logic chipset further comprises:
    a peripheral component interconnect (PCI) interface logic connected to PCI input-output devices on a PCI bus; and
    said PCI interface logic connected to said processor interface logic and said memory interface logic.

11. The computer system of claim 1, further comprising a PCI-to-PCI bridge connected between said PCI bus and said AGP processor.

12. The computer system of claim 1, further comprising a plurality of processors.

13. The computer system of claim 1, further comprising a video display.

14. The computer system of claim 1, further comprising a network interface card, a hard disk, a floppy disk drive, a modem, a keyboard, and a mouse.

15. The computer system of claim 1, further comprising a serial port, a parallel port, a keyboard and a real time clock.

16. The computer system of claim 1, further comprising a read only memory basic input-output system (ROM BIOS), a non-volatile random access memory (NVRAM), a tape drive and a CD ROM drive.

17. A method, in a computer system having a core logic chipset which connects a computer processor and main memory to an accelerated graphics port (AGP) processor, of merging AGP transaction read requests from the AGP processor into a cacheline of main memory access, said method comprising the steps of:
    a) reading an accelerated graphics port (AGP) transaction request from an AGP request queue;
    b) if the AGP transaction request is a read request then start a read access to the computer system main memory for a cacheline of AGP graphics data for retiring the AGP transaction read request;
    c) reading a next AGP transaction request from the AGP request queue to determine if the next AGP transaction request can be retired from the cacheline of AGP graphics data being accessed from the main memory;

d) if the next AGP transaction request is a read request and can be retired from the cacheline of AGP graphics data being accessed then read another AGP transaction request from the AGP request queue;

e) if the next AGP transaction request is a read request but cannot be retired from the cacheline of AGP graphics data being accessed then start another access to the computer system main memory for another cacheline of AGP graphics data for retiring the next AGP read request; and f) repeating steps c) through e) until there are no more AGP transaction requests in the AGP request queue.

18. The method of claim 17, further comprising the step of storing the cacheline of AGP graphics data in a memory data buffer for retiring a future AGP transaction read request.

19. The method of claim 17, further comprising the step of prefetching another cacheline of AGP graphics data and storing the another cacheline of AGP graphics data in a memory data buffer for retiring at least one future AGP transaction read request.

20. The method of claim 19, wherein the step of prefetching another cacheline of AGP graphics data is the step of prefetching a plurality of cachelines of AGP graphics data from the main memory.

21. The method of claim 20, further comprising the step of storing the prefetched plurality of cachelines of AGP graphics data in a memory data buffer for retiring future AGP transaction read requests.

22. The method of claim 17, further comprising the step of setting a bit corresponding to each AGP transaction request in the AGP request queue that can be retired by the cacheline of AGP graphics data being accessed so that a grant signal and target ready signal will be sent to the AGP processor when the cacheline of AGP graphics data is read from the main memory read access.

23. A core logic chipset adapted for connecting a computer processor and memory to an accelerated graphics port (AGP) processor, comprising:

an accelerated graphics port (AGP) request queue;

an AGP data and control logic;

an AGP arbiter;

a memory interface and control logic adapted for connection to a main memory; and a processor interface adapted for connection to at least one processor; wherein, said AGP request queue is connected to said memory interface and control logic;

said AGP data and control logic is connected to said memory interface and control logic;

said AGP data and control logic is adapted for connection to an AGP bus having an AGP device; wherein, said AGP request queue stores AGP transaction requests for the AGP device;

said AGP data and control logic reads an AGP transaction request from said AGP request queue and if the AGP transaction request is a read request then said memory interface and control logic initiates a read access of a cacheline of main memory so as to retire the read request; and said AGP data and control logic reads a next AGP transaction request from said AGP request queue to determine if the initiated read access of the cacheline of main memory can retire the next AGP transaction request, if so, the next AGP transaction request does not cause said memory interface and control logic to initiate read access of another cacheline of the main memory, and if not, the next AGP transaction request causes said memory interface and control logic to initiate a read access of another cacheline of the main memory.

24. The core logic chipset of claim 23, further comprising a memory data buffer for storing the accessed cacheline of main memory, the stored cacheline of main memory being used to retire at least one future AGP transaction read request.

25. The core logic chipset of claim 24, wherein said memory data buffer can store a plurality of cachelines of main memory.

* * * * *